United States Patent [19]

Brulé Paul L.

[11] Patent Number: 4,650,067

[45] Date of Patent: Mar. 17, 1987

[54] CONVEYOR

[75] Inventor: Brulé Paul L., Plainwell, Mich.

[73] Assignee: Ventureprise, Inc., Kalamazoo, Mich.

[21] Appl. No.: 809,524

[22] Filed: Dec. 16, 1985

[51] Int. Cl.⁴ ............................................. B65G 15/60
[52] U.S. Cl. ..................................... 198/841; 198/816; 198/860.3
[58] Field of Search ................ 198/525, 550.01, 550.9, 198/816, 817, 823, 836, 837, 841, 860.1, 860.3

[56] References Cited

U.S. PATENT DOCUMENTS

| 1,854,561 | 4/1932 | Owens et al. | 198/860.3 |
| 3,878,937 | 4/1975 | Glaser et al. | 198/836 X |
| 3,944,054 | 3/1976 | Ensinger | 198/860.3 |
| 4,013,167 | 3/1977 | Bourgeois | 198/841 X |
| 4,050,575 | 9/1977 | Rossio | 198/841 X |
| 4,081,075 | 3/1978 | Puretic | 198/860.3 X |
| 4,222,482 | 9/1980 | Kelley | 198/841 X |
| 4,321,996 | 3/1982 | Sancken et al. | 198/821 X |
| 4,518,303 | 5/1985 | Moser | 198/841 X |

FOREIGN PATENT DOCUMENTS

| 0593606 | 3/1960 | Canada | 198/860.1 |
| 2382385 | 11/1978 | France | 198/860.1 |

Primary Examiner—Joseph E. Valenza
Assistant Examiner—Lyle Kimms
Attorney, Agent, or Firm—Gordon W. Hueschen

[57] ABSTRACT

The disclosed conveyor has a frame which comprises side channel members and crosspieces on which are mounted rollers, a supporting plate, an endless belt, elongate side members having side portions and a U-shaped portions in which the edges of the supporting plate are disposed, and end cover comprising a cover plate and end cover members which are complementary with and affixed to the side wall portions. The conveyor is mounted on a portable base and has standard control for starting and stopping the conveyor belt.

10 Claims, 4 Drawing Figures

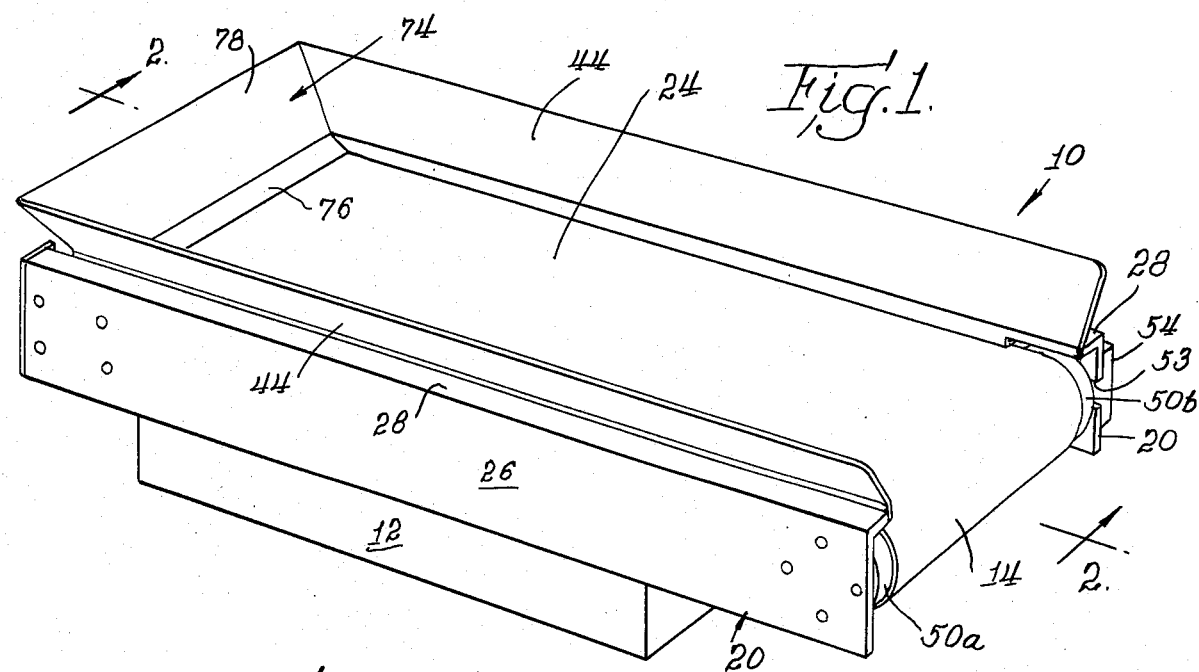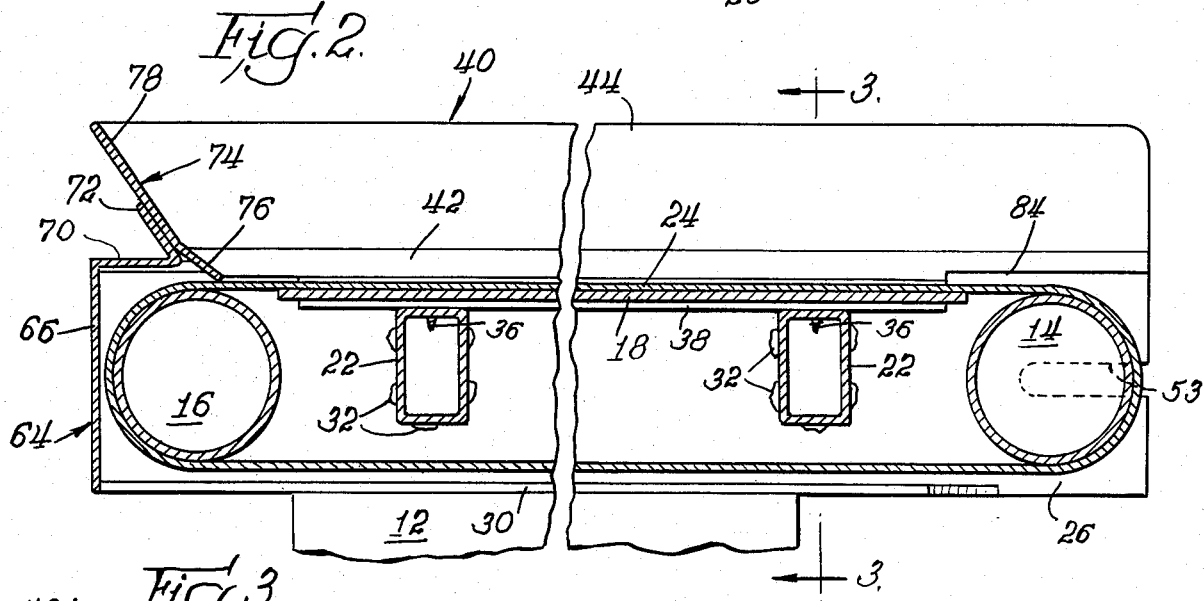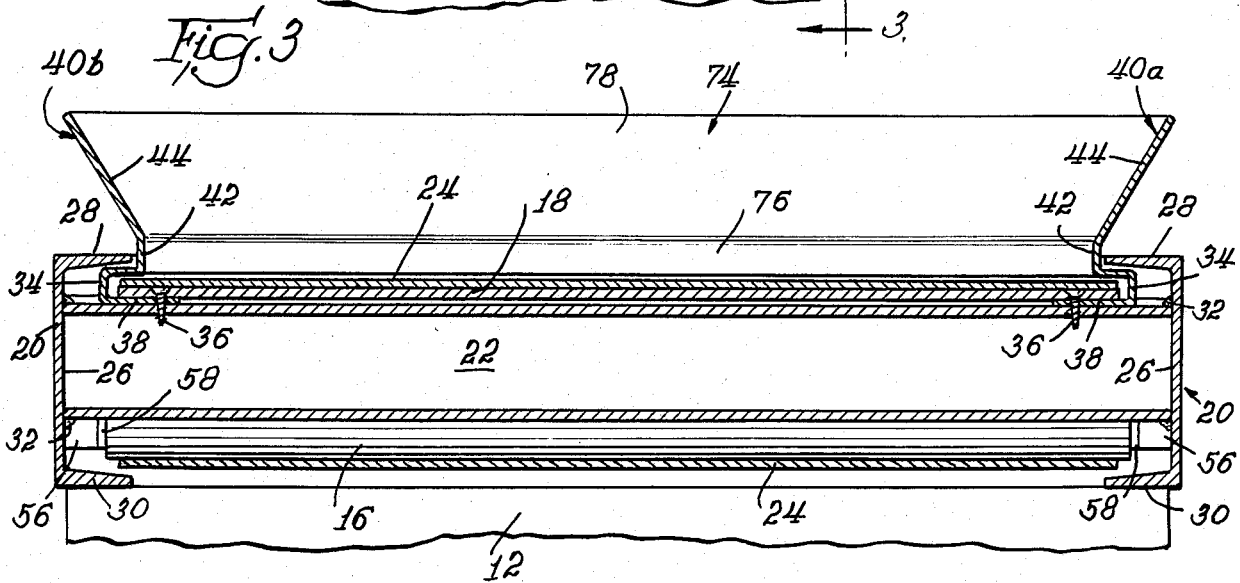

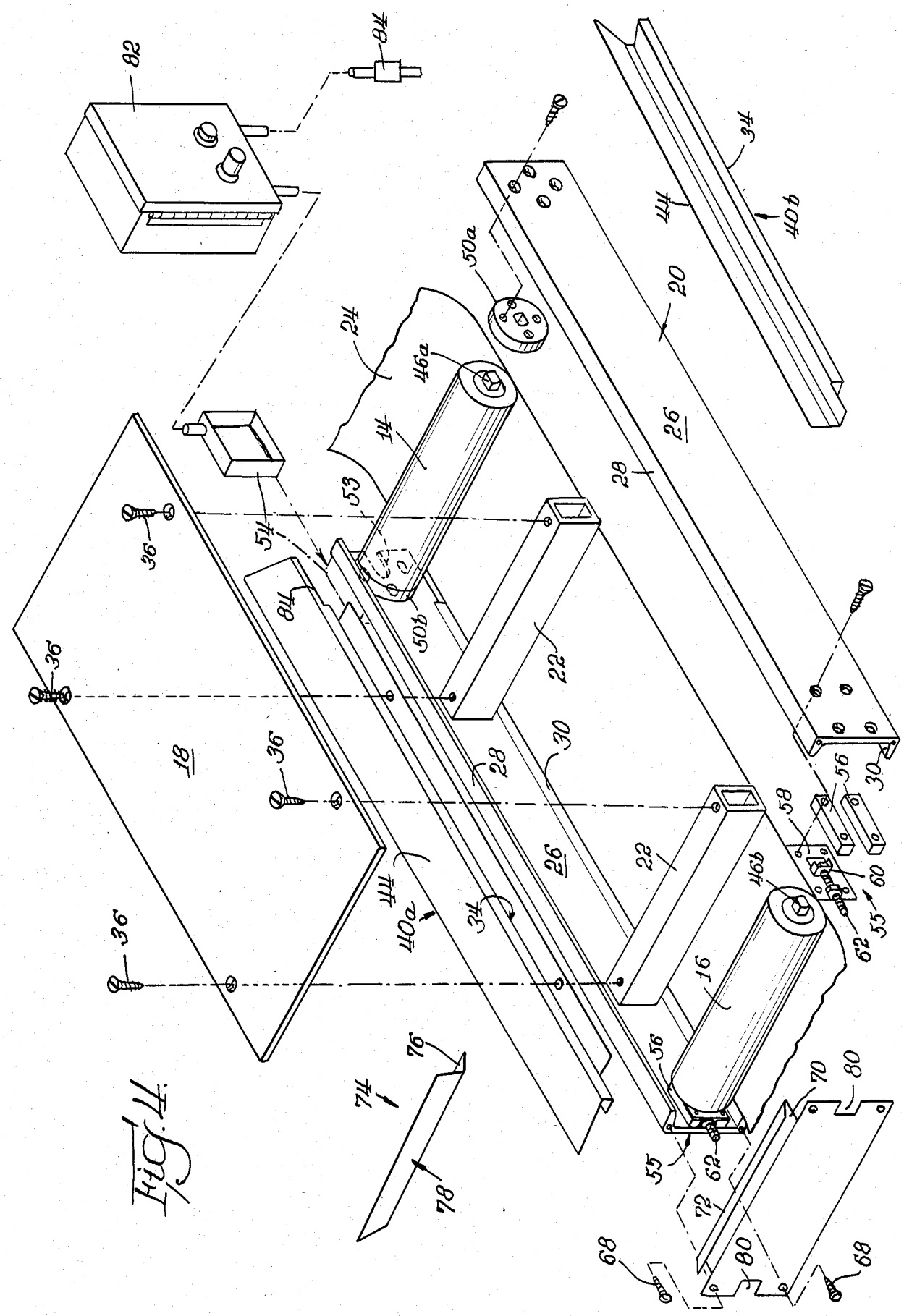

CONVEYOR

BACKGROUND OF THE INVENTION

Field Of The Invention And Prior Art

The invention relates to a conveyor and is particularly directed to a conveyor that is simple of construction, light-weight and portable.

Conveyors comprising an endless belt, a drive roller, an idler roller, a supporting plate underlying the endless belt, and frame means for supporting the various components thereof are well known in the art. The conveyors of the prior art, however, do not compete with that of the invention in regard to simplicity of construction, lightness of weight, and portability.

SUMMARY OF THE INVENTION

The invention relates to improvements in a conveyor comprising an endless belt, a drive roller, an idler roller, a supporting plate underlying said endless belt, and frame means for supporting said rollers and said supporting plate in a position such that said endless belt is supported by said supporting plate in which:

said frame means comprises parallel planar members each of which has an inturned member at the top edge thereof;

crosspiece means is rigidly affixed to said planar members to hold said planar members in the stated parallel position with the inturned members thereof toward each other in a common plane;

said supporting plate has its edges disposed in elongate, U-shaped members which in turn are disposed between said corsspiece means and said inturned members;

said rollers turn on trasverse axles one of which is affixed to said planar members adjacent one end thereof by fixed means and the other of which is affixed by longitudinally-adjustable means affixed to said planar members adjacent the other end thereof and in positions to hold the uppermost surfaces of said rollers in a plane common with the supporting surface of said supporting plate; and said supporting plate is made of ultra, high-molecular weight, rigid plastic and said endless belt is made of flexible plastic at least one of which plastics has a self-lubricating plastic surface juxtaposed to a surface of the other.

The invention also comprises one or more further features in which said supporting plate and said elongate, U-shaped members are fastened to said crosspiece means by fastening means passing through both said supporting plate and the bottoms of said elongate, U-shaped members;

the axle of said idler roller has off-round ends having longitudinally-disposed, parallel faces which are mounted for longitudinal movement in faceplate means affixed to said planar members and having complementary, longitudinally-disposed, parallel faces, and comprises adjustable thrust means for adjusting the position of said axle to effect adjustment of the tension on said belt;

said crosspiece means comprises hollow tubular members welded or otherwise affixed to said planar members;

said side wall members extend from the inner edges of said U-shaped members to give said conveyor a substantially trough-like, transverse cross section;

said endpiece means is fastened to said planar members at one end thereof and to said side wall members for closing that end of said conveyor;

said side wall members each has a bottom portion which extends from adjacent said belt to a position adjacent the top of the adjacent inturned member and a top portion thereabove;

said endpiece means comprises an angle piece having a transverse plate which extends from one planar member to the other and an inturned flange at the top thereof which extends to a position overlying said idler roller and the endless belt therefrom from one side wall member to the other and has an end wall member which is complementary with said side wall members and is affixed thereto.

said endpiece means comprises a reverse flange which extends rearwardly from the front edge of said inturned flange and constitutes a base member on which said end wall is mounted;

said end wall member comprises a bottom portion which angles up to the top edges of the bottom portions of said wall members and a top portion which is complementary to the top portion of said side wall members; and the upper surface of said supporting plate is self-lubricating.

BRIEF DESCRIPTION OF THE DRAWINGS

FIG. 1 is a perspective view;
FIG. 2 is a section taken on line 2—2 of FIG. 1;
FIG. 3 is a section taken on line 2—2 of FIG. 1; and
FIG. 4 is an exploded view with parts broken away.

DETAILED DESCRIPTION OF THE PREFERRED EMBODIMENT

In the drawing, there is shown a conveyor 10 mounted on a stand or base 12 having a drive roller 14, an idler roller 16, a supporting plate 18, frame members 20–22, and an endless belt 24.

The frame memers 20–22 each comprises a channel-shaped member 20 having a vertically-disposed, planar member or face 26 with an inturned member or flange 28 along the upper edge thereof and a supporting member or flange 30 inturned from the bottom edge thereof.

The member 20 are united by crosspieces 22 which are welded, as shown at 32, or otherwise affixed to the inner surface of the faces 26 to form a unitary frame structure.

The crosspieces 22 advantageously are hollow tubular members having a rectangular cross section, as best seen in FIGS. 2 and 4.

The supporting plate 18 has each edge disposed in an elongate, U-shaped member 34, which members in turn are disposed between the supporting plate 18 and the inturned flanges 28, and the supporting plate 18 is fastened to the crosspieces by fastening means 36, which pass through both the supporting plate and the bottom portion of the U-shaped member 34. This bottom portion is extended, as shown at 38, that is, offset, relative to the upper portion thereof, so that the fastening means, suitably, a screw, can be inserted from above without interference from the upper portion of the U-shaped member.

Extending upwardly from the upper edges of the U-shaped members 34 are side members 40, each of which comprises a bottom section or portion 42 which extends up vertically to just above the inturned flange 28 and a top section or portion 44 which angles upward and outwardly, as best seen in FIG. 3.

The rollers 14 and 16 turn or rotate on axles 46 which have off-round ends 46a and 46b which are mounted in face plate means affixed to the side members 26 in a position such that the uppermost surface of the roller lies in a horizontal plane which is common with the upper surface of the supporting plate 18.

The drive roller 14 is supported by faceplates 50a and 50b which are affixed to the inner surfaces of the channel members 26. The faceplates have holes 52 in the center thereof which are complementary with the off-round end of the axle 46a. Faceplate 50b is mounted over a slot 53 into the end of the side member for purpose of a pigtail which enters into the drive roller 14 from the header box 54 for the power which activates a motor in the drive roller 14 in a manner already well known in the art.

The faceplate means 55 for mounting the idler roller 16 comprises parallel blocks 56 and an adjustable thrust block-assembly 58 which are affixed to the side member 26 so that the off-round ends 46b can slide longitudinally therein as thrust block 60 is adjusted by screws 62.

The endless belt 24 is looped around the two rollers and rides on top of the supporting plate 18. The tension thereof is adjustable by means of screws 62.

The supporting plate 18 is made of ultra, high-molecular weight, rigid plastic having a self lubricating surface and the endless belt is made of flexible plastic which also, if desired, can have a self-lubricating surface. Either one or both plastics can have self-lubricating juxtaposed surfaces. Plastics thus composed are well known in the art for like purposes and, therefore, need not be explicitly described herein.

The rear end of the conveyor has a cover 64 having a vertical portion 66 adapted to extend from one channel member to the other and to be fastened thereto by sheet metal screws 68, or the like, and an inturned flange 70 which extends longitudinally to a position overlying the idler roller 16 and the endless belt 24 thereon. The inturned flange has a reverse flange 72 at the inner end thereof which angles upwardly and outwardly and forms a base for an end wall member 74. The end wall member 74 has a bottom portion 76 which angles rearwardly and upwardly to the top of the bottom portions 42 of the side members 40 and a top portion 78 which angles rearwardly and upwardly at an angle complementary with that of the top portions 44 of the side wall members 40. These top and bottom portions are welded respectively to the top and bottom portions 44 and 42 of the side members 40.

The end plate 66 has cutouts 80 in alignment with the screws 62 so that the tension on the belt can be adjusted easily.

At 82 is a control box of conventional design having "OFF" and "ON" switches and at 84 there is shown a suitable electrical connection, usually a wall plug or the like. The side member 40a can have a portion of the vertical wall 34 cut away as at 84, to facilitate the installation and removal of the header box 54.

The conveyor can be assembled by first forming the frame with the supporting plate, the rollers, and the belt in place; then sliding the side members 40 and the supporting plate, singly or as a unit, into the space between the inturned top flange and the belt and fastening them down with the fasteners 36. The end cover can then be fastened to the end of the conveyor and the end wall member 74 welded in place. There is thus obtained a conveyor which is light weight and portable and easily assembled into a unitary, rugged device. If desired, the bottom portion 76 of the end wall member 74 can be made of flexible material, the free end of which rides on the belt 24.

While the invention has been described and illustrated with regard to a preferred embodiment, it is to be understood that the precise details thereof, the design thereof, the orientation thereof, and the like, are not vital as long as the objectives of the invention are realized. For example, while the invention is most conveniently used where the endless belt moves horizontally, it is to be understood that it can be oriented at an angle, or vertically. Likewise, the belt can be so guided that it will move with parts thereof at an angle to other parts thereof. Also, it will be understood that article-engaging means can be mounted on the belt, especially when it is mounted to move vertically or at a steep angle. In such application, it is sometimes desirable to dispense with the side and end members.

it is to be understood that the invention is not to be limited to the exact details of construction, operation, or exact materials or embodiments shown and described, as various modifications and equivalents will be apparent to one skilled in the art, and the invention is therefore to be limited only by the full scope of the appended claims.

I claim:

1. In a conveyor comprising an endless belt, a drive roller, an idler roller, a supporting plate underlying said endless belt, and frame means for supporting said rollers and said supporting plate in a position such that said endless belt is supported by said supporting plate;

the improvement in which:

said frame means comprises parallel planar members each of which has an inturned member at the top edge thereof;

crosspiece means is rigidly affixed to said planar members to hold said planar members in the stated parallel position with the inturned members thereof inturned toward each other in a common plane;

said supporting plate has its edges disposed in elongate, U-shaped members which in turn are disposed between said crosspiece means and said inturned members;

said rollers turn on transverse axles one of which is affixed to said planar members adjacent one end thereof by fixed means and the other of which is affixed by longitudinally-adjustable means affixed to said planar members adjacent the other end thereof and in positions to hold the uppermost surfaces of the said rollers in a plane common with the supporting surface of said supporting plate;

side wall members extend from the inner edges of said U-shaped members to give said conveyor a substantially trough-like, transverse cross section;

endpiece means is fastened to said planar members at one end thereof and to said side wall members for closing that end of said conveyor; and said supporting plate is made of ultra, high-molecular weight, rigid plastic and said endless belt is made of flexible plastic at least one of which plastics has a self-lubricating surface juxtaposed to a surface of the other.

2. A conveyor of claim 1 in which said supporting plate and said elongate, U-shaped members are fastened to said crosspiece means by fastening means passing through both said supporting plate and the bottoms of said elongate U-shaped members.

3. A conveyor of claim 1 in which the axle of said idler roller has off-round ends having longitudinally-disposed, parallel faces which are mounted for longitudinal movement in faceplate means affixed to said planar members and having complementary, longitudinally-disposed, parallel faces, and comprises adjustable thrust means for adjusting the position of said axle to effect adjustment of the tension on said belt.

4. A conveyor of claim 1 in which said crosspiece means comprises hollow tubular members welded or otherwise affixed to said planar members.

5. A conveyor of claim 1 in which said side wall members each has a bottom portion which extends from adjacent said belt to a position adjacent above the top of the adjacent inturned member and a top portion thereabove.

6. A conveyor of claim 5 in which said endpiece means comprises an angle piece having a transverse plate which extends from one planar member to the other and an inturned flange at the top thereof which extends to a position overlying said idler roller and the endless belt therefrom from one side wall member to the other and has an end wall member which is complementary with said side wall members and is affixed thereto.

7. A conveyor of claim 6 in which said endpiece means comprises a reverse flange which extends rearwardly from the front edge of said inturned flange and constitutes a base member on which said end wall is mounted.

8. A conveyor of claim 7 in which said end wall member comprises a portion which angles up to the top edges of the bottom portions of said side wall members and a top portion which is complementary to the top portion of said side wall members.

9. A conveyor of claim 1 in which the upper surface of said supporting plate is self-lubricating.

10. In a conveyor comprising an endless belt, a drive roller, an idler roller, a supporting plate underlying said endless belt, and frame means for supporting said rollers and said supporting plate in a position such that said endless belt is supported by said supporting plate;
  the improvement in which:
  said frame means comprises parallel planar members each of which has an inturned member at the top edge thereof;
  crosspiece means is rigidly affixed to said planar members to hold said planar members in the stated parallel position with the inturned members thereof inturned toward each other in a common plane;
  said supporting plate has its edges disposed in elongate, U-shaped members which in turn are disposed between said crosspiece means and said inturned members;
  said rollers turn on transverse axles one of which is affixed to said planar members adjacent one end thereof by fixed means and the other of which is affixed by longitudinally-adjustable means affixed to said planar members adjacent the other end thereof and in positions to hold the uppermost surfaces of said rollers in a plane common with the supporting surface of said supporting plate;
  side wall members extend from the inner edges of said U-shaped members to give said conveyor a substantially trough-like, transverse cross section;
  endpiece means is fastened to said planar members at one end thereof and to said side wall members for closing that end of said conveyor;
  said supporting plate is made of ultra, high-molecular weight, rigid plastic and said endless belt is made of flexible plastic at least one of which plastics has a self-lubricating surface juxtaposed to a surface of the other;
  said supporting plate and said elongate, U-shaped members are fastened to said crosspiece means by fastening means passing through both said supporting plate and the bottoms of said elongate U-shaped members;
  the axle of said idler roller has off-round ends having longitudinally-disposed, parallel faces which are mounted for longitudinal movement in faceplate means affixed to said planar members and having complementary, longitudinally-disposed, parallel faces, and comprises adjustable thrust means for adjusting the position of said axle to effect adjustment of the tension on said belt;
  said crosspiece means comprises hollow tubular members welded or otherwise affixed to said planar members;
  said side wall members each has a bottom portion which extends from adjacent said belt to a position adjacent above the top of the adjacent inturned member and a top portion thereabove;
  said endpiece means comprises an angle piece having a transverse plate which extends from one planar member to the other and an inturned flange at the top thereof which extends to a position overlying said idler roller and the endless belt therefrom from one side wall member to the other and has an end wall member which is complementary with said side wall members and is affixed thereto;
  said endpiece means comprises a reverse flange which extends rearwardly from the front edge of said inturned flange and constitutes a base member on which said end wall is mounted;
  said end wall member comprises a bottom portion which angles up to the top edges of the bottom portions of said wall members and a top portion which is complementary to the top portion of said side wall members; and
  the upper surface of said supporting plate is self-lubricating.

* * * * *

UNITED STATES PATENT AND TRADEMARK OFFICE
CERTIFICATE OF CORRECTION

PATENT NO. : 4,650,067

DATED : March 17, 1987

INVENTOR(S) : Paul L. Brule'

It is certified that error appears in the above-identified patent and that said Letters Patent is hereby corrected as shown below:

Col. 1, line 34; "corsspiece" should read -- crosspiece --

Col. 1, line 36; "trasverse" should read -- transverse --

Col. 4, line 21; "it" should read -- It --

Signed and Sealed this

Eighteenth Day of August, 1987

Attest:

DONALD J. QUIGG

*Attesting Officer*     *Commissioner of Patents and Trademarks*